United States Patent
Bacik et al.

(10) Patent No.: US 7,328,734 B2
(45) Date of Patent: Feb. 12, 2008

(54) PORTABLE THERMO-PLASTIC WELDING MACHINE AND METHOD

(75) Inventors: Brian Bacik, Midhurst (CA); Kechang Xing, Brampton (CA)

(73) Assignee: Royal Group, Inc., Atlanta, GA (US)

( * ) Notice: Subject to any disclaimer, the term of this patent is extended or adjusted under 35 U.S.C. 154(b) by 284 days.

(21) Appl. No.: 10/952,438

(22) Filed: Sep. 29, 2004

(65) Prior Publication Data
US 2005/0121132 A1    Jun. 9, 2005

(30) Foreign Application Priority Data
Sep. 29, 2003    (CA)    .................... 2,443,091

(51) Int. Cl.
*B29C 65/20* (2006.01)
*B32B 37/04* (2006.01)

(52) U.S. Cl. .................. 156/358; 156/304.2; 156/359; 156/499; 156/502; 156/507

(58) Field of Classification Search ............. 156/304.2, 156/358, 359, 499, 502, 503, 507
See application file for complete search history.

(56) References Cited

U.S. PATENT DOCUMENTS

| | | | |
|---|---|---|---|
| 4,352,708 A | | 10/1982 | McElroy |
| 4,752,350 A | * | 6/1988 | Schuster .................. 156/379.6 |
| 4,867,835 A | * | 9/1989 | Poole .......................... 156/507 |
| 4,957,570 A | | 9/1990 | Jenkins et al. |
| 5,013,376 A | | 5/1991 | McElroy, II et al. |
| 5,527,406 A | | 6/1996 | Brath |
| 5,584,960 A | * | 12/1996 | Hunter et al. ................ 156/389 |
| 5,620,625 A | | 4/1997 | Sauron et al. |
| 5,788,790 A | | 8/1998 | Andrew |
| 6,036,795 A | | 3/2000 | Sauron |
| 6,119,752 A | * | 9/2000 | Zollinger et al. ........... 156/499 |
| 6,550,514 B1 | | 4/2003 | Andrew |

\* cited by examiner

*Primary Examiner*—Mark A Osele
(74) *Attorney, Agent, or Firm*—Hunton & William LLP

(57) ABSTRACT

A machine and method for welding thermo-plastic rain gutters or other work pieces together. The machine includes a frame assembly and a protective shroud. Handles or a wheeled carriage are provided for transporting the machine to a work site. A stationary plate and a moveable plate are each secured to the frame assembly. Work piece holders and corresponding clamps specially configured for clamping rain gutters or other work pieces are disposed on the stationary and moveable plates together with a spacer plate for positioning and holding the ends of two work pieces in a position for welding the ends together. A heater is provided for heating the ends of the work pieces to a desired welding temperature and a press is provided for pressing and holding the molten ends of the work pieces together for welding.

17 Claims, 12 Drawing Sheets

UNCLAMP FIRST AND SECOND CLAMPS

READY FOR START-UP

FIG. 13B

PORTABLE THERMO-PLASTIC WELDING MACHINE AND METHOD

FIELD OF THE INVENTION

The present invention is directed to machines and methods for welding plastic articles together and in particular to portable machines and methods for welding rain gutters and other non-cylindrical multi-faceted thermo plastic building products together at a work site.

BACKGROUND OF THE INVENTION

Many products used in the construction industry that were traditionally formed of metal or other materials can be replaced with products that are formed of plastic. Rain gutters for instance were traditionally made from metal and are now available in plastic.

Metal rain gutters are produced using roll forming technology, which unwinds coils of flat metal stock and then drives the metal through a series of rollers and forming dies in order to bend it into the desired shape of the gutter profile. The metal gutter can be manufactured on large industrial grade equipment in a factory setting or by portable roll formers that can easily be transported to the job site for use by installers. The portable roll former allows the installers to field measure the length of gutter sections required and then fabricate the gutter to the specified length.

Plastic rain gutters are produced by an extrusion process in a large industrial setting, supported by ancillary equipment to provide the energy and means to heat the plastic to a molten state, transfer the material through forming dies and then cool the plastic to the desired profile. Based on the nature of this extrusion production process, plastic rain gutters can only be manufactured, in an economic manner, in a factory setting and then cut to predetermined lengths. The overall length of the manufactured plastic gutter sections is physically limited to lengths that can be practically stored in retail locations and then transported to job sites for installation. Lengths of 10-16 ft are most common. Plastic fittings are then used to adjoin adjacent straight sections of gutter when the system is installed on a building requiring longer lengths Plastic rain gutters offer improved durability to that of metal rain gutters because they are dent, crack and peel resistant during installation or long term use. These gutters tend to be easier to install and are favored by "Do it Yourself" installers because they do not have sharp edges like the metal systems that can cut fingers and hands. In addition, unlike metal systems that require caulking compounds to seal adjoining gutter sections, most plastic systems use fittings with a self contained gasket system that make the installations easier.

Despite the product benefits offered by the plastic systems, trade professionals and installers generally prefer the convenience and flexibility offered by the portable metal roll forming fabrication process. As a result, most trade professionals invest in portable roll forming equipment to manufacture metal gutter to custom lengths on site. Installers are assured that once installed, the gutter will not leak along the length of the gutter. In addition, the continuous length of gutter is preferred from an aesthetic perspective offering clean, smooth visual lines along the face of a building as compared to the non-continuous appearance that results when a number of fittings are used to adjoin plastic gutter sections.

There is a need for a device that allows the trade professional to offer the product benefits of plastic rain gutters to a client while offering the installation convenience and flexibility traditionally associated with on site metal rain gutters fabricators. This need can similarly be found for other forms of plastic building products including architectural moldings and trim, wall siding and door and window frames. There is also a need for a device that is safe and simple to operate so that it may be used by non-professionals as well.

SUMMARY OF THE INVENTION

In one aspect the invention provides a machine for welding the ends of two thermo-plastic rain gutters together, the machine comprising:

a frame assembly;

a first holder disposed on said frame assembly for supporting the first rain gutter, said first holder having a cross sectional profile corresponding to the cross sectional profile of the first rain gutter;

a second holder disposed on said frame assembly for supporting the second rain gutter, said second holder having a cross sectional profile corresponding to the cross sectional profile of the second rain gutter;

a first clamp assembly disposed on said frame assembly for clamping the first rain gutter against the first holder;

a second clamp assembly disposed on said frame assembly for clamping the second rain gutter against the second holder;

a heater disposed on said frame assembly for heating the ends of the first and second rain gutters a sufficient amount to permit the ends of the rain gutters to be welded together; and a press disposed on said frame assembly for pressing and holding the molten ends of the first and second rain gutters together so that the molten ends become welded together.

In another aspect the invention provides a machine for welding the ends of two thermo-plastic non-cylindrical work pieces together, the machine comprising:

a frame assembly;

a first holder disposed on said frame assembly for supporting the first work piece, said first mantle having a cross sectional profile corresponding to the cross sectional profile of the first work piece;

a second holder disposed on said frame assembly for supporting the second work piece, said second mantle having a cross sectional profile corresponding to the cross sectional profile of the second work piece;

a first clamp assembly disposed on said frame assembly for clamping the first work piece against the first holder;

a second clamp assembly disposed on said frame assembly for clamping the second work piece against the second holder;

a heater disposed on said frame assembly for heating the ends of the first and second work pieces a sufficient amount to permit the work pieces to be welded together; and a press disposed on said frame assembly for pressing and holding the molten ends of the first and second work pieces together so that the molten ends become welded together.

In another aspect the invention provides a portable machine for welding the ends of two thermo-plastic rain gutters together, the portable machine comprising:

a first assembly for securing the first rain gutter and a second assembly for securing the second rain gutter;

a heater for heating the ends of at least one of the first and second rain gutters a sufficient amount to permit the ends of the first and second rain gutters to be welded together, said heater defining at least one groove that is configured to receive the end of one of said first and second rain gutters; and a press for pressing and holding the ends of the first and second rain gutters together so that the ends may become welded together.

In another aspect the invention provides a portable machine for welding the ends of two thermo-plastic work pieces together, the portable machine comprising:

a first assembly for securing the first rain gutter and a second assembly for securing the second rain gutter;

a heater for heating the ends of at least one of the first and second rain gutters a sufficient amount to permit the ends of the first and second rain gutters to be welded together;

a press for pressing and holding the ends of the first and second rain gutters together so that the ends may become welded together; and a flashing tool having an inclined leading edge for engaging the flashing and facilitating removal of a flashing formed when said first and second rain gutters are pressed together.

In another aspect the invention provides a method for installing thermo-plastic rain gutters on a building, the method comprising the steps of:
(a) measuring the length of rain gutter required;
(b) selecting two or more rain gutter sections for forming said desired length of rain gutter;
(c) welding said rain gutter sections together end to end; and
(d) securing said length of welded rain gutter to said building.

BRIEF DESCRIPTION OF THE DRAWINGS

For a better understanding of the present invention and to show more clearly how it may be carried into effect, reference will now be made by way of example to the accompanying drawings. The drawings show preferred embodiments of the present invention, in which:

FIGS. 13A and 13B are a flow chart of a method of operation of the machine in accordance with the present invention.

DETAILED DESCRIPTION OF THE INVENTION

Figure 1:
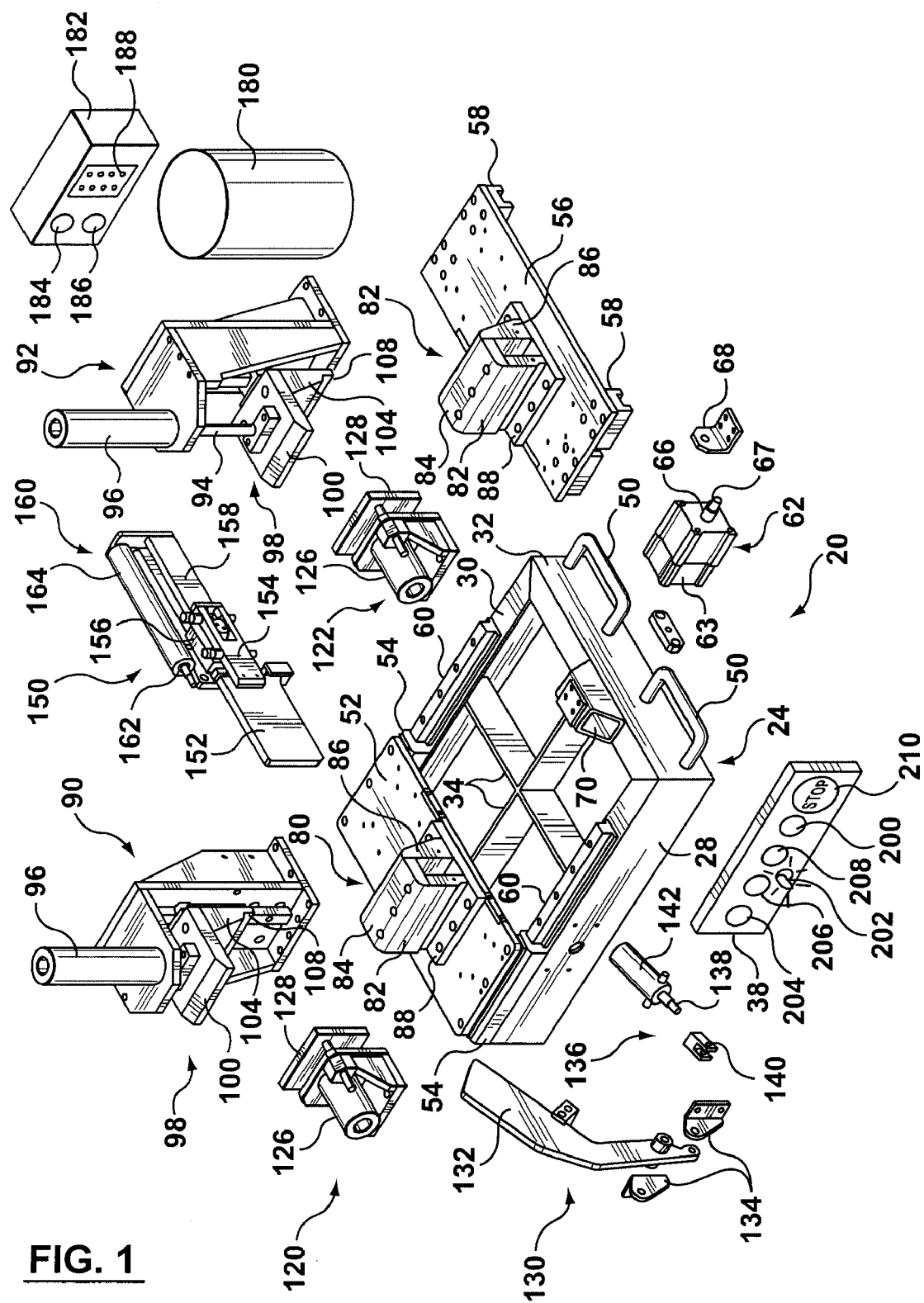
FIG. 1 is an exploded front perspective view of a portable plastic welding machine in accordance with the present invention.
Figure 2:
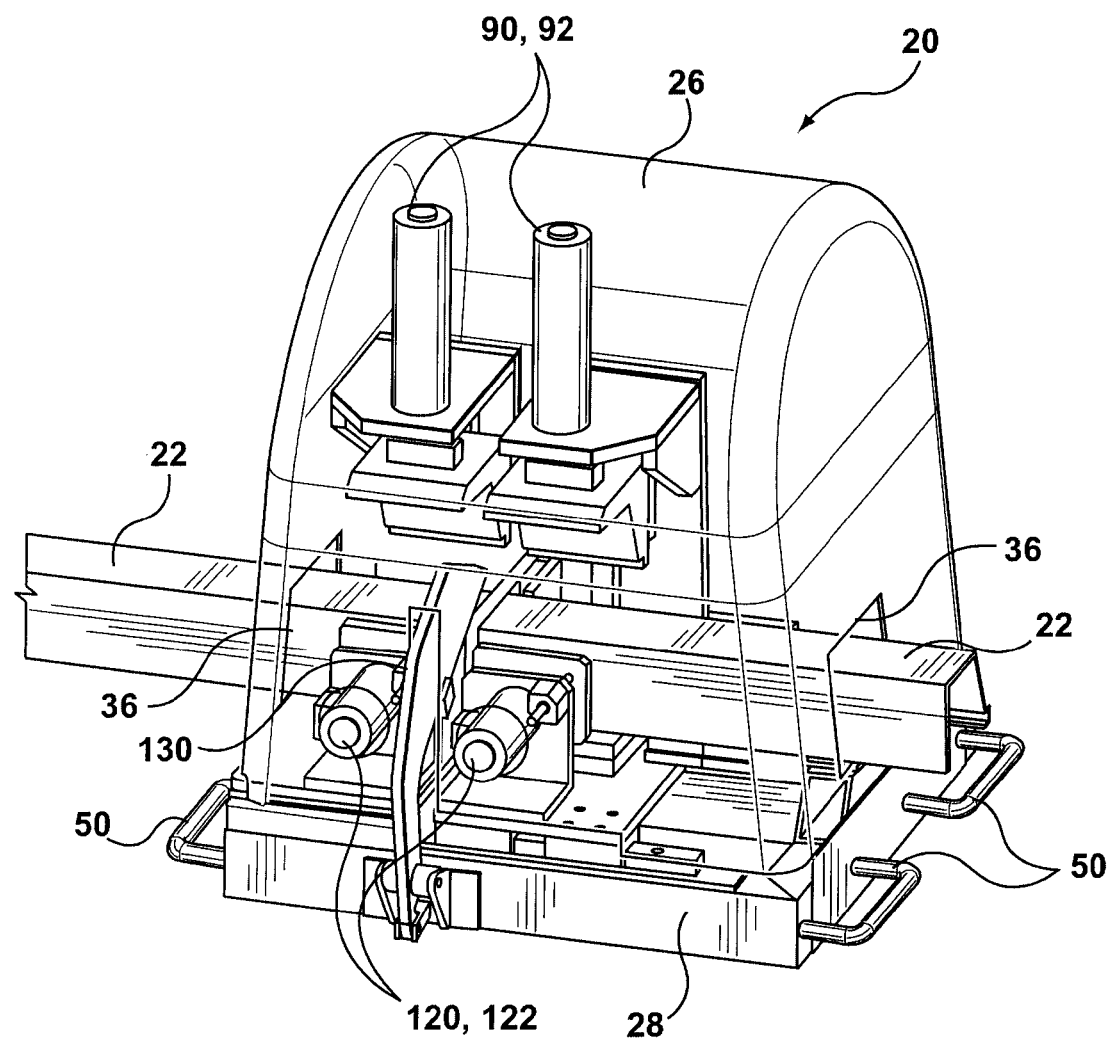
FIG. 2 is a front perspective view of the machine of FIG. 1.
Figure 3:
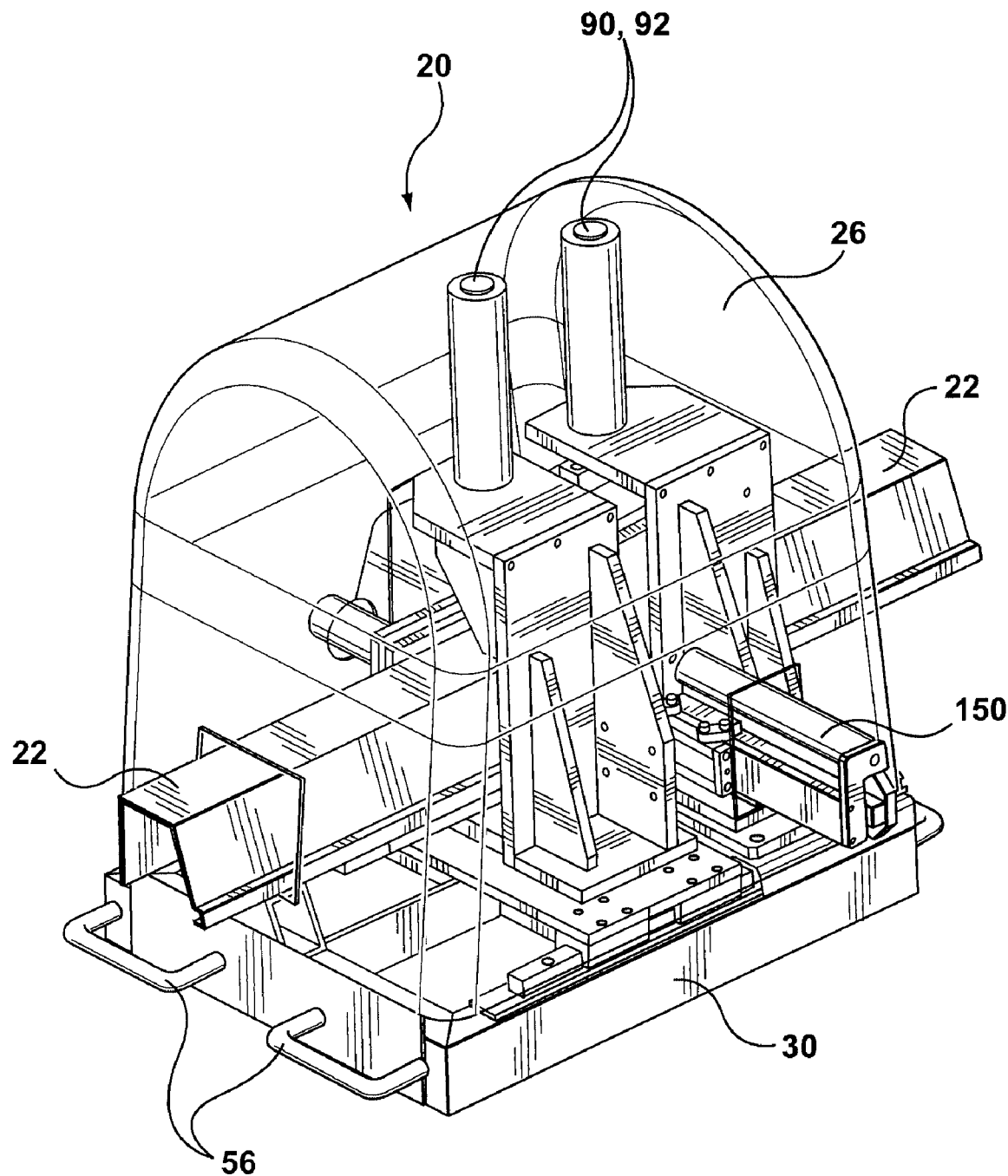
FIG. 3 is a rear perspective view of the machine of FIG. 1.
Figure 4:
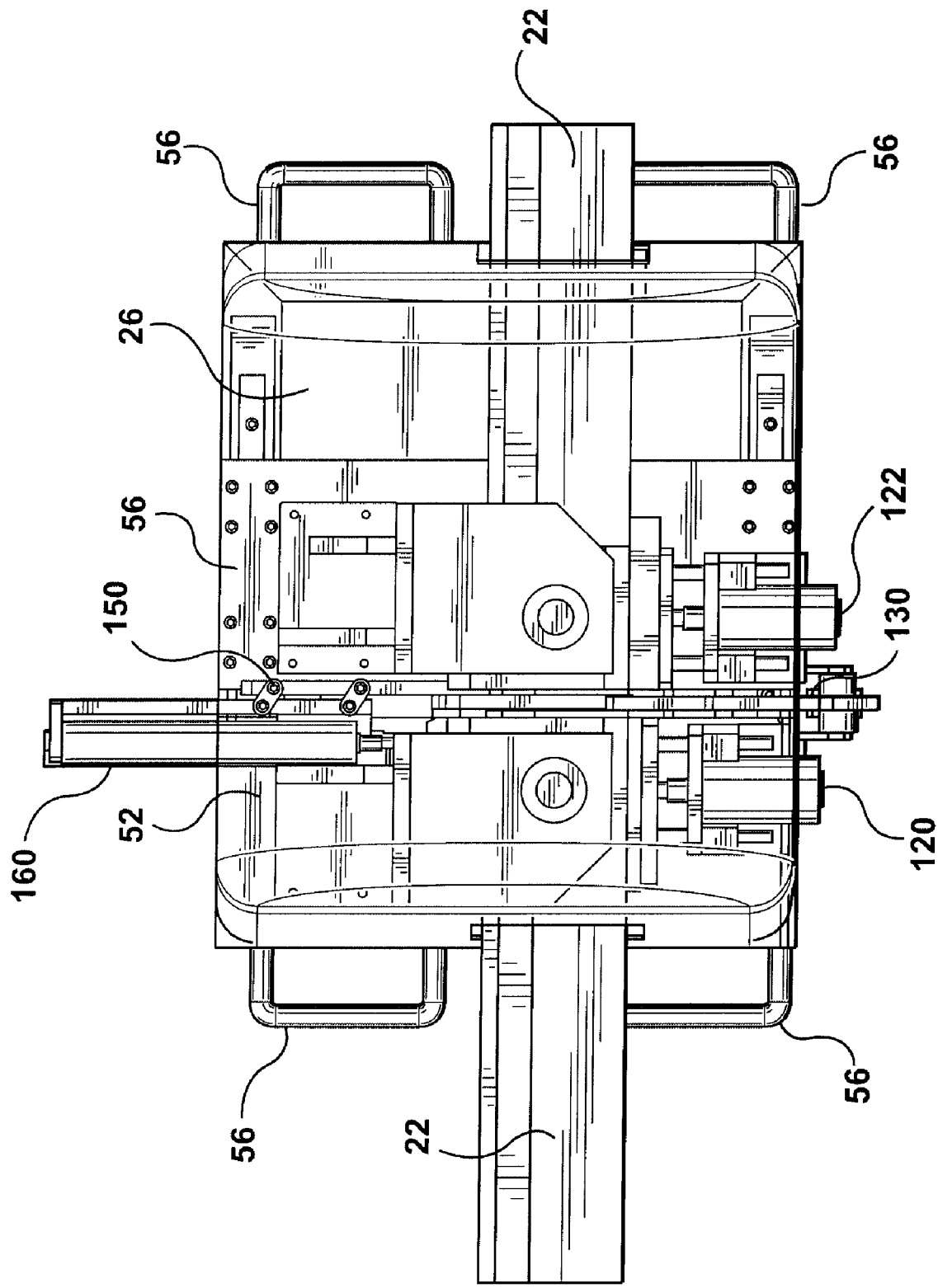
FIG. 4 is top view of the machine of FIG. 1.
Figure 5:
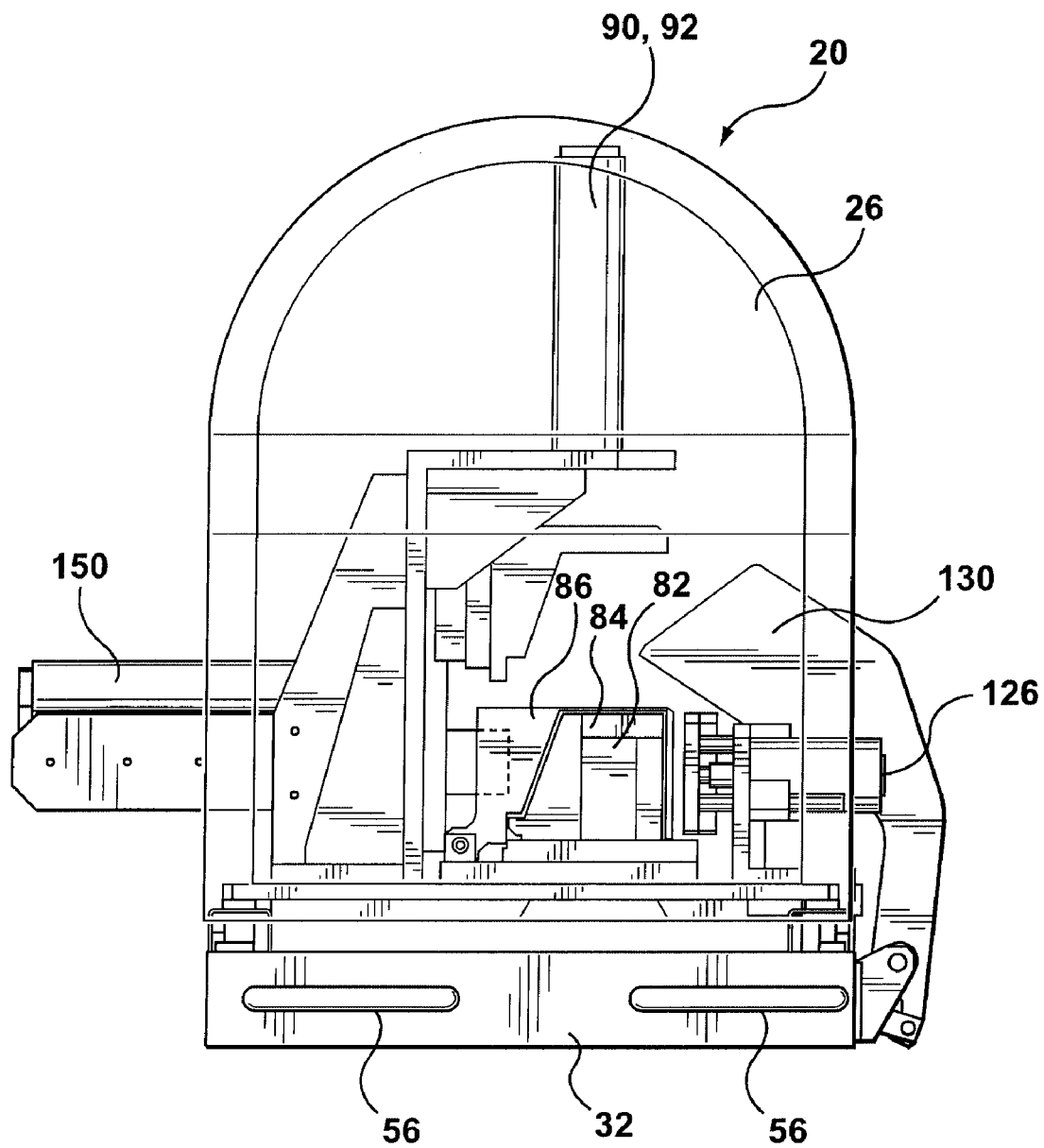
FIG. 5 is a side view the machine of FIG. 1.
Figure 6:
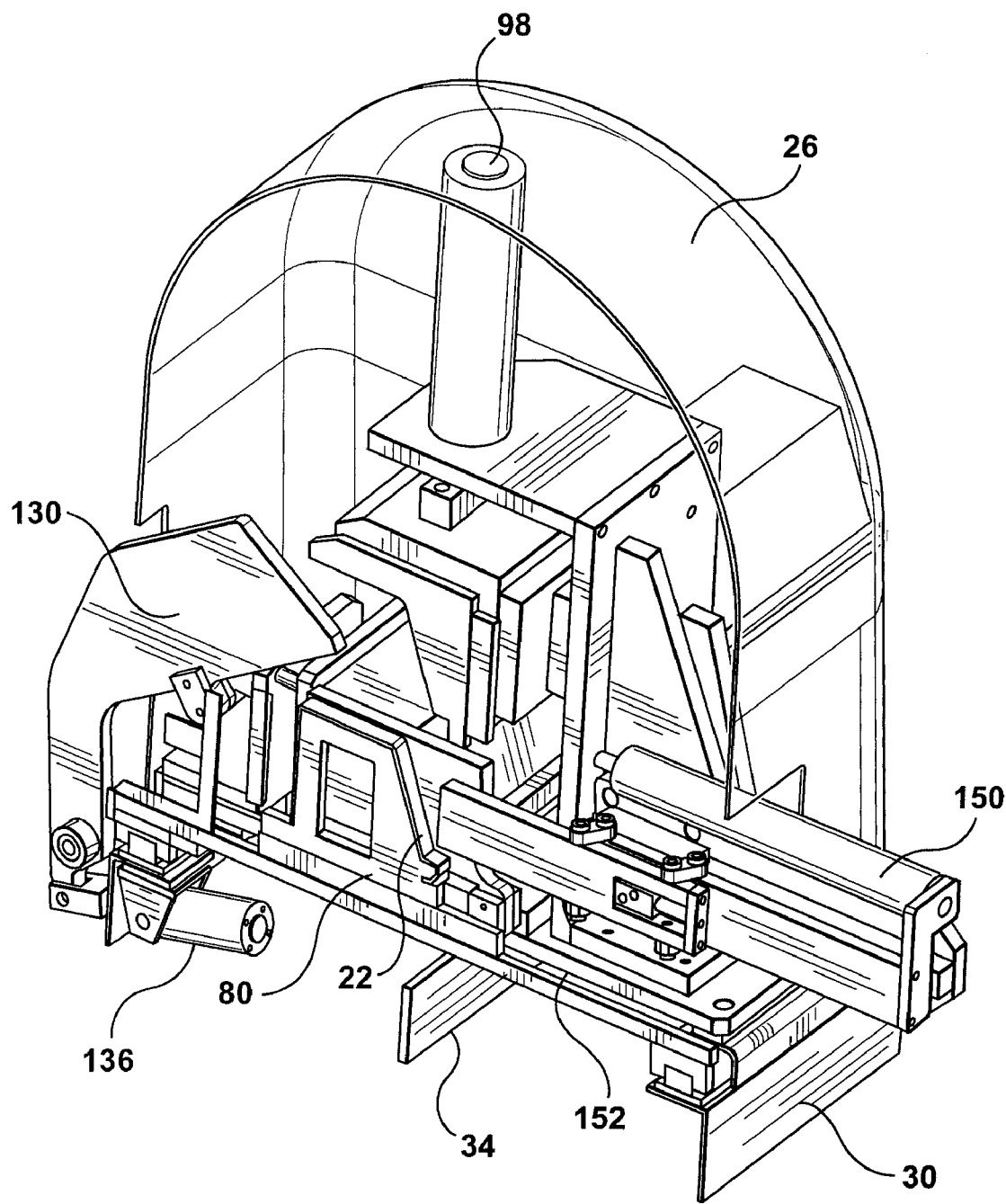
FIG. 6 is a sectional view of the machine of FIG. 1 as viewed along lines 6-6.

A portable thermo-plastic welding machine in accordance with the present invention is shown generally at 20 in the Figures. The machine 20 is adapted for welding together thermo-plastic work pieces 22 such as rain gutters (as shown in the Figures), architectural moldings and trim, door frames, window frames or wall siding. The rain gutters most preferred for use with the present machine have a thermo-plastic cellular double wall construction that provides for a relatively lightweight and strong product while presenting a larger surface area for welding.

The machine 20 includes a frame assembly having a base 24 and a shroud 26. The base 24 has front and rear side members 28 and 30 that are rigidly connected to end members 32. The base 24 further includes cross members 34 that extend between the inside surfaces of side members 28, 30 and end members 32 to reinforce the base 24 without adding substantially to its weight. The shroud 26 is preferably made of a shatterproof translucent or transparent material such as plexiglas that surrounds the working components of the machine 20 so that the machine may be operated safely. The shroud 26 includes openings 36 for inserting the respective work pieces 22 and removing the welded end product. The shroud 26 may be connected with hinges (not shown) to rear side member 30 to allow the shroud 26 to be opened to access the machine 20 and the work pieces 22. A control panel 38 is located on the front side member 28 or any other location on the machine that is convenient for access by the operator.

The frame assembly includes handles 50 that are securely connected to end members 34 to facilitate carriage of the machine. The machine is sized so that it may be lifted by two persons and carried on the back of a pick-up truck or trailer to a work site. The machine may also be supported on its own wheeled base so that it may be towed by a vehicle (see FIG. 12).

The machine includes a stationary plate 52 secured with brackets 54 to side members 28, 30. A moveable plate 56 is secured to runners 58 that ride along rails 60 secured to side members 28, 30. A plate actuator 62 is connected with head 63 to the moveable plate 56 and with corresponding cylinder 66 and piston 67 is secured with a clevis 68 to a bracket 70 secured to end member 34. Plate actuator 62 acts to move the moveable plate 56 along runners 58 to one of several desired positions to press, hold and release work pieces as described further below. The preferred embodiment is provided with only one moveable plate 56 to simplify the overall construction of the machine however it will be understood that the stationary plate 52 may be replaced with a second moveable plate that is disposed on runners and that is controlled by a second plate actuator.

The machine includes first and second work piece holders 80 and 82 secured respectively to the stationary plate 52 and moving plate 56. The work piece holders 80 are each configured to match the surface profile of the work piece 22 that is being welded. The work piece holders 80, 82 as shown in the Figures are configured to match the profile of a rain gutter. In this configuration each work piece holder has first and second plates 82 and 84 disposed at right angles to one another and a third plate 86 extending at a downward and outward incline from the second plate 84. The first, second and third plates are all secured to a base plate 88 to the respective stationary and moveable plates 52, 56.

First and second work piece clamp assemblies 90 and 92 are secured respectively to the stationary plate 52 and the moveable plate 56. Each of the work piece clamp assemblies has a piston 94 and corresponding cylinder 96 supported generally at a right angle above the upper surfaces of the work piece holders 80. Clamp plates 98 are located at the end of pistons 94 and arranged generally parallel to the corresponding holder plates 84, 86 for clamping the work piece to the respective holders 80. In the case of a rain gutter work piece as depicted in the Figures, the clamp plates include an upper plate 100, for clamping an upper surface 102 of the rain gutter to the respective holder 80, and a backing plate 104, for clamping a back surface 106 of the rain gutter to the respective holder 80. Backing plate includes a shoulder 108 for clamping a corresponding lip 110 extending from the rain gutter.

First and second site clamp assemblies 120 and 122 are secured respectively to stationary and moveable plates 52, 56. Each of the site clamp assemblies has a piston 124 and corresponding cylinder 126 supported generally at a right angle to the front side surfaces of the work piece holders 80. A clamp plate 128 is located at the end of each piston 124 and arranged generally parallel to the corresponding plate of the work piece holder 80 for clamping the work piece to the respective holder 80. In the case of a rain gutter work piece as depicted in the Figures, the clamp plate includes a side engaging plate, for clamping a side surface of the rain gutter to the respective holders.

The work piece clamp assemblies 90, 92 and the site clamp assemblies 120,122 thus act together to clamp the work piece 22 sufficiently securely against the work piece holders 80 so that the subsequent welding operations can be accurately performed. It will be understood that different shapes and arrangements of clamp assemblies and work piece holders may be provided according to the particular shape characteristics of the work piece being supported (such as a moulding or wall siding).

The machine includes a spacer assembly 130 for providing an abutment to position the ends of the respective work pieces 22 in the desired location for the subsequent welding operation to be accurately performed. Spacer assembly 130 includes a spacer bar 132 that is pivotally secured at one end to side member with clevis 134. A spacer bar actuating assembly 136 has a piston 138 that is secured at one end to spacer bar 132 using a rod clevis 140 and a corresponding cylinder 142 that is secured to the front side member. Spacer bar actuating assembly 136 thus acts to move the spacer bar 132 from an abutment position to a non-abutment position relative to the ends of the work pieces 22.

The machine includes a heat plate assembly 150 for heating the respective ends of the work pieces 22. Heat plate assembly 150 includes a double sided heat plate 152 that is secured to a bracket 154 and is spring biased to allow movement of the assembly 150 toward the stationary plate during the heating process and can accommodate imperfections in the profile cuts of work pieces 22. Bracket 154 has runners 156 for guiding bracket 154 along a rail 158. A heat plate actuating assembly 160 is provided for moving heat plate 152 between a heating position located between the two work pieces 22 and a non-heating position away from the two work pieces 22. The heat plate actuating assembly 160 includes a piston 162 that is connected to the bracket 154 and a corresponding cylinder 164 that is connected to stationary plate 52.

Figure 9:
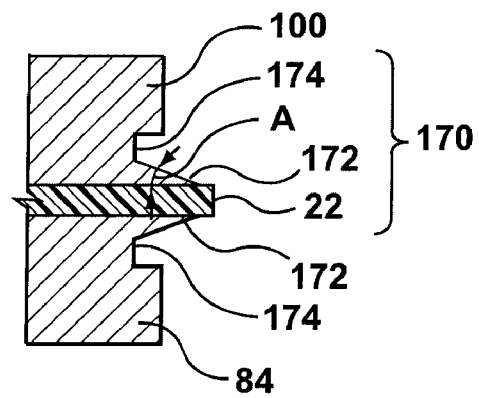
FIG. 9 is a sectional view of a flashing remover for the machine as viewed along lines 9-9 in FIG. 8.

A flashing remover 170 (see FIG. 9 and description below) is provided for aiding in removal of the flashing that is formed on the welded work pieces during the welding operation. Alternatively, the flashing may be removed manually using snips or a similar removal tool.

A pump 180 is provided for supplying a pressurized gas or fluid to drive the piston and cylinder combinations for the clamp assemblies and the actuating assemblies. The assemblies are preferably pneumatically driven however they may instead be hydraulically, electrically or manually driven, or any combination of the above as will be understood by persons skilled in the art.

Figure 7:
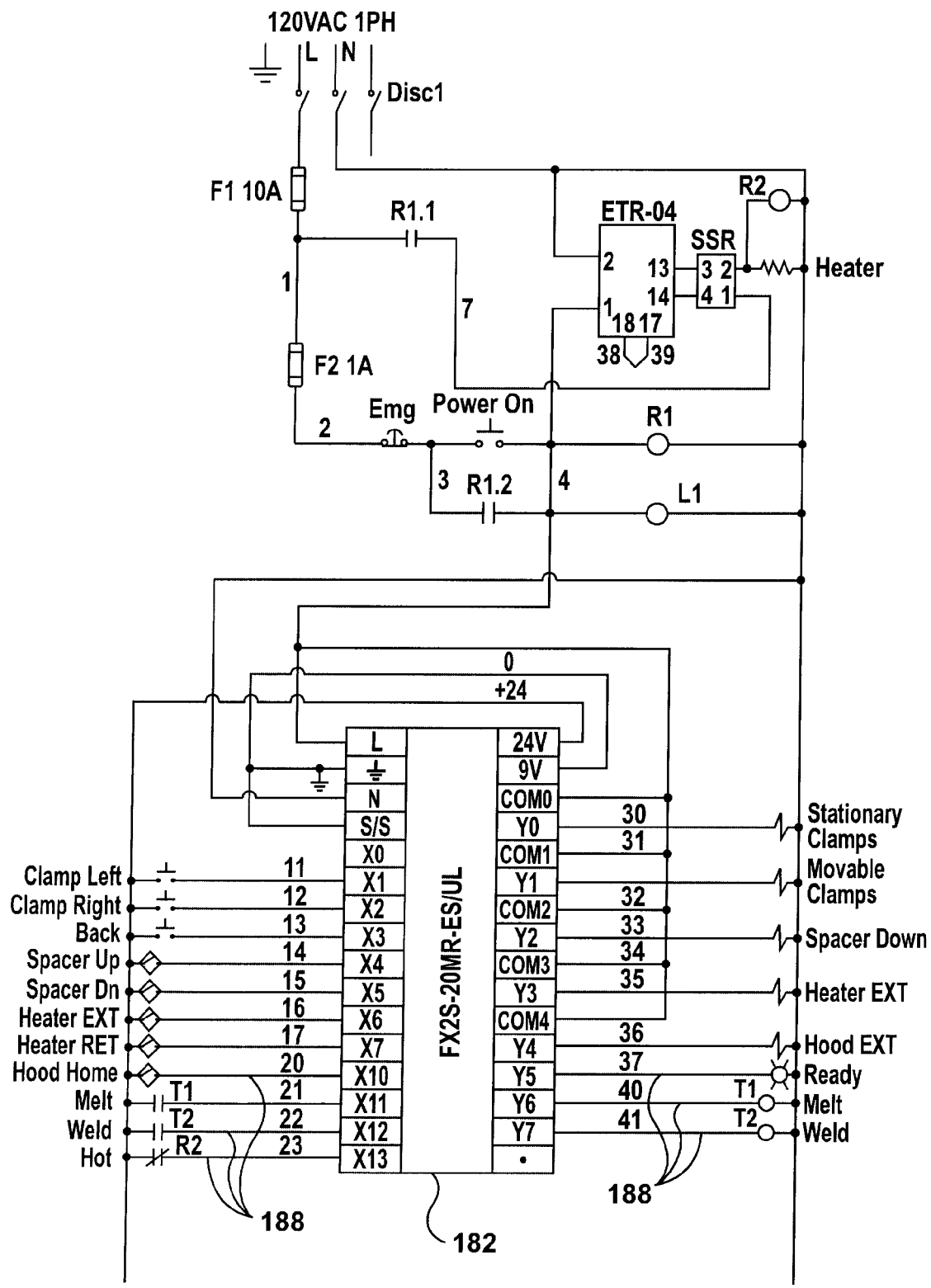
FIG. 7 is a schematic view of a control circuit for the machine of FIG. 1.
Figure 8:
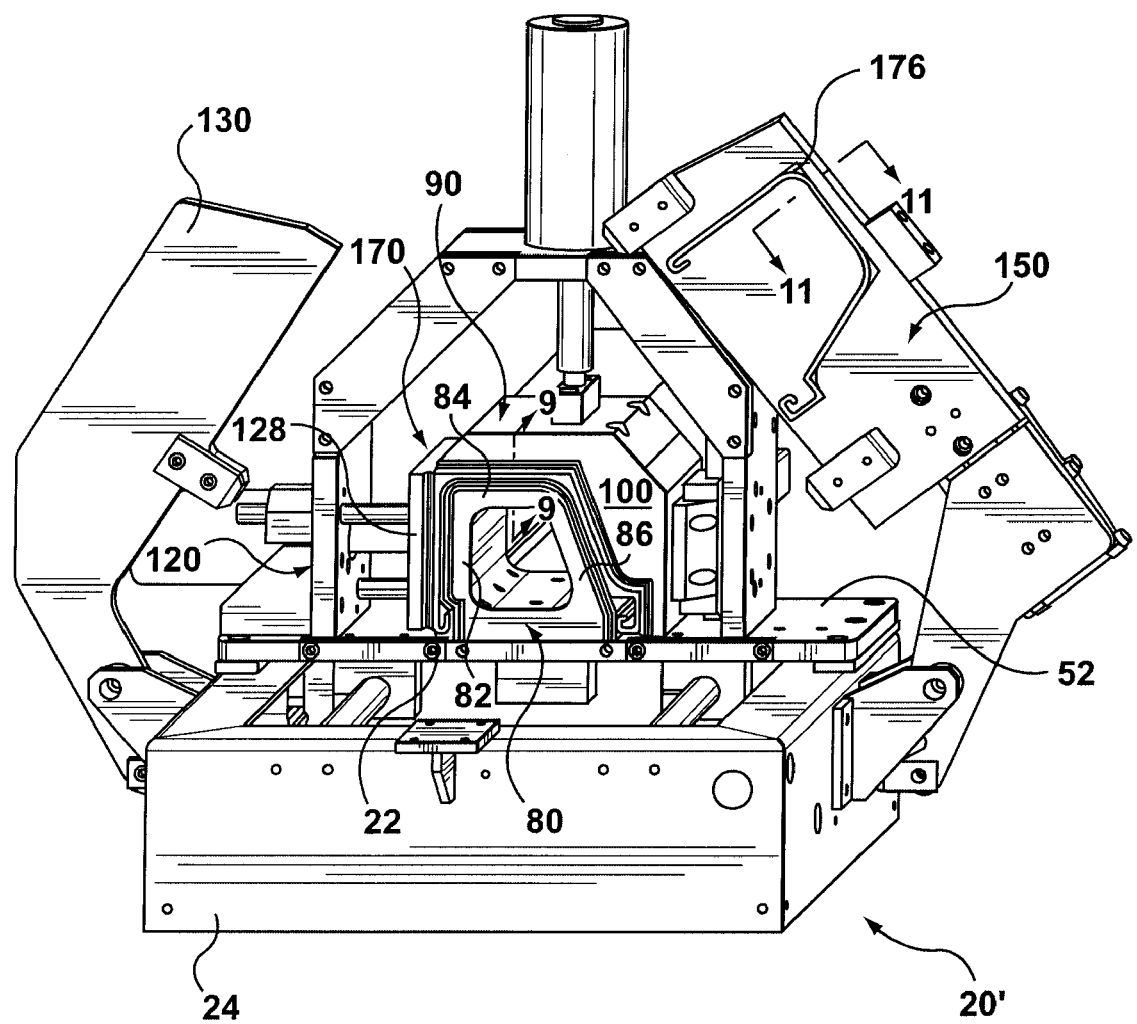
FIG. 8 is an end perspective view of a portion of the machine in accordance with another embodiment of the present invention.

A programmable logic controller 182 is provided for controlling the operation of the machine. The controller 182 includes an adjustable thermostat 184 for the heat plate, an adjustable timer 186 for controlling the heating and welding cycles and control links 188 to each of the clamp and actuator assemblies. Referring to FIG. 7, one configuration for the controller circuit is shown.

Referring to FIGS. 8-11, certain portions of a welding machine 20' in accordance with another embodiment of the present invention are shown. For ease of reference, the reference numerals used to describe elements for the embodiment above are also used to identify corresponding elements of the embodiment described below. It should also be understood that FIG. 8 does not depict all of the elements of the machine 20' such as shroud 26, second work piece holder 82 and second work piece clamp assembly 92. These elements have been omitted to simplify depiction of other elements of the machine 20'.

Figure 10:
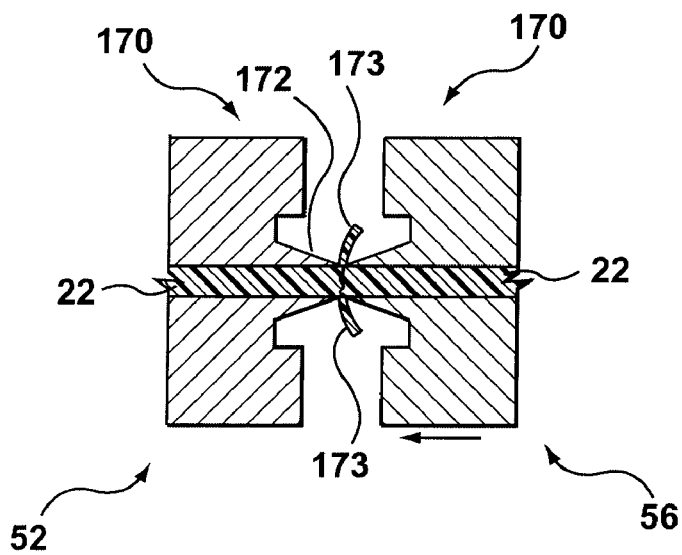
FIG. 10 is a schematic view of the flashing remover of FIG. 9 engaging a flashing during welding of two work pieces.

The machine 20' includes a flashing remover 170 defined on both the stationary plate and the moveable plate by work piece holders 80 and 82, work piece clamp assemblies 90 and 92 and site clamp assemblies 120 and 122. Flashing remover 170 includes a leading edge 172 defined respectively on plates 82, 84 and 86 of the corresponding work piece holders 80 and 82, plates 100 and 104 of corresponding work piece clamp assemblies 90 and 92 and plate 128 of site clamp assemblies 120 and 122. The leading edge 172 preferably has an incline angle A of between 30 degrees and 45 degrees to direct flashing 173 away from the newly welded interface between work pieces 22 and thus facilitate removal of flashing 173 or formation of a weakened edge (not shown) of the corresponding flashing 173. The weakened edge allows the flashing to be removed manually following the welding operation either by hand or with the aid of a cutting tool. Flashing remover 170 further includes a recess 174 for receiving the flashing during the period when the moveable plate is being moved into close proximity to the stationary plate. As shown in FIG. 10, a pair of opposing flashing removers 170 come into close proximity to one another to direct flashing 173 away from the welded interface to facilitate removal or to define a weakened edge on the flashing. Alternatively, a single flashing remover 170 may be defined on one of the stationery or moveable assemblies with the other forming a backing surface for the flashing 173.

Figure 11:
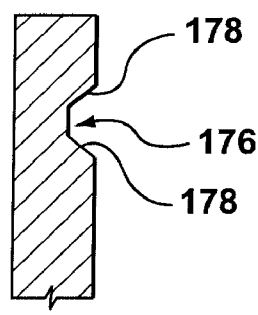
FIG. 11 is a sectional view of the groove on the heater plate for the machine as viewed along lines 11-11 in FIG. 8.

Referring to FIG. 11, the heater plate assembly 150 includes a groove 176 defined on at least one side of the heater plate. Groove 176 has a peripheral shape generally corresponding to the peripheral shape of the work piece. The groove 176 is adapted to receive the work piece in order to facilitate better heat displacement throughout the end of the work piece and to control formation of the weld flashing. The groove 176 includes inclined edges 178 that assist in guiding the work piece 22 into the groove 176. It is preferred that the groove 176 have a depth of approximately 5 to 6 millimeters for the rain gutter work pieces 22 contemplated by one aspect of the present invention. The currently preferred embodiment provides a groove 176 on the moveable plate side of the heater plate. This is preferred so that the moveable plate, upon completion of the heating step, may be retracted sufficiently to remove the work piece from the groove 176 and allow the heater plate to be moved out of position prior to welding. Heater plate is preferably coated with Teflon™ or similar materials that resist adherence of the thermo-plastic material to the heater plate.

Figure 12:
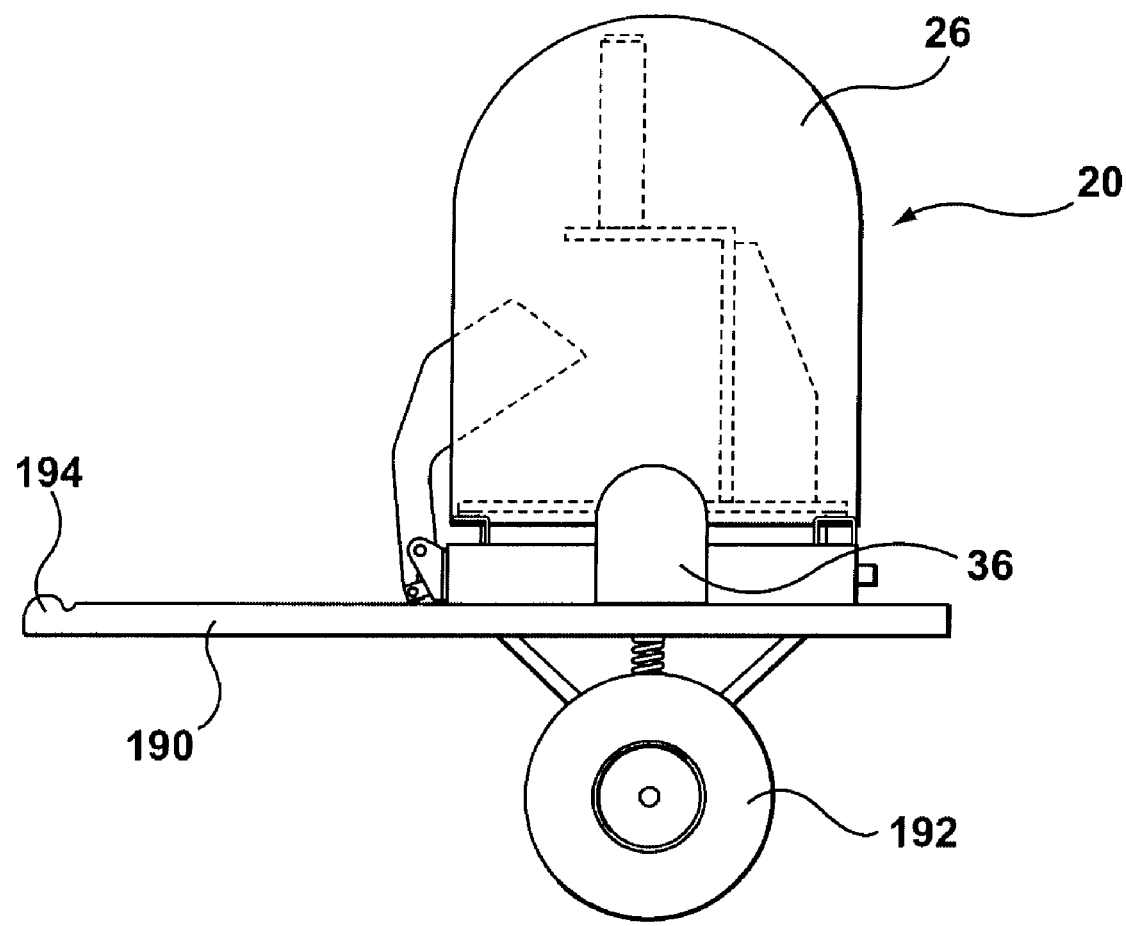
FIG. 12 is a schematic view of the machine having a wheeled base in accordance with another embodiment of the present invention.

Referring to FIG. 12, another embodiment of the machine 20' is shown. The machine 20' includes a carriage having a base 190 that rides on wheels 192. The carriage includes a tow attachment 194 to facilitate towing behind a vehicle to a work site.

Figure 13A:
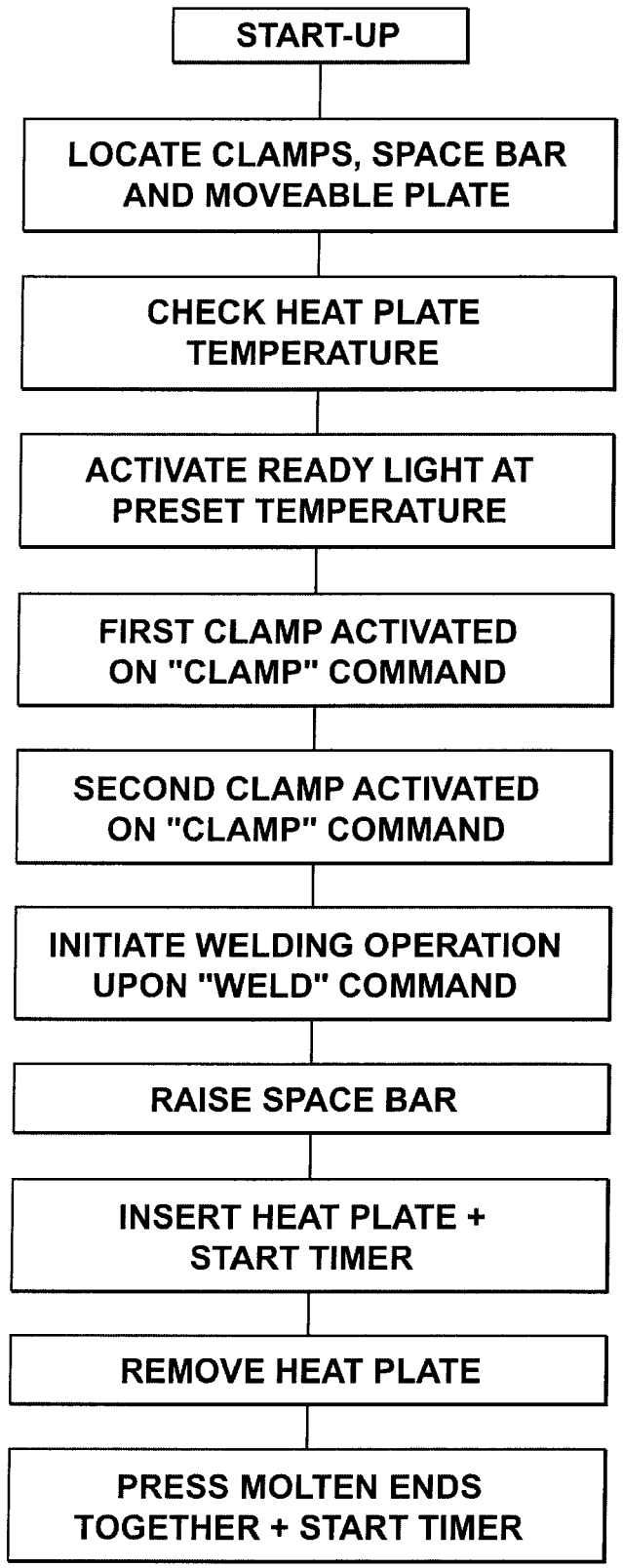

A process of operation for the machine is shown in FIGS. 13A and 13B. The process begins with start-up of the machine by having the machine operator press the Start control 200. Upon start-up the controller 182 positions clamp assemblies at their unclamped positions, spacer bar in its lowered position and moveable plate in its non-abutting position. Controller 182 also activates heat plate so that it heats to a pre-determined melt temperature that is monitored by thermostat 184. The preferred temperature range for the work pieces 22 contemplated by the present invention is between 200 and 350 degrees Celsius and most preferably between 275 and 300 degrees Celsius for PVC rain gutter work pieces. Sensors (not shown) may be added to sense the outside temperature and to signal controller to alter plate temperature and/or heat cycle time.

Once heat plate reaches its pre-determined temperature as sensed by thermostat 184, controller 182 causes Ready light 202 to be activated to signal that the machine is ready to begin the welding operation. The operator then inserts one work piece 22 through the opening in shroud such that it fits over the first work piece holder and its end squarely abuts spacer plate. The operator then presses the Left Clamp 204 button to cause the first work piece clamp and the first site clamp to each move from an unclamped position to a clamped position so that the work piece 22 is held firmly against the holder. The operator then inserts another work piece 22, of equivalent profile as the first work piece 22, through the opening in shroud such that it fits over second work piece holder and its end squarely abuts spacer plate. The operator then presses the Right Clamp 206 button to cause the second work piece clamp and the second site clamp to each move from an unclamped position to a clamped position so that the work piece is held firmly against the holder. Work pieces 22 could also be positioned or removed by pivoting open shroud 26.

Once both work pieces 22 are clamped into position the operator presses the Weld button 208 to initiate the automatic welding process.

Upon sensing that the Weld button has been pressed, controller 182 causes space bar actuating assembly to move spacer bar away from between the work pieces and heater actuating assembly to move heat plate to a position between the work pieces. Controller 182 then causes plate actuating assembly to move the moveable plate towards the stationary plate a pre-determined distance so that the ends of work pieces 22 engage each side of the heat plate. The spring biased heating plate 152 moves towards work piece 22 on stationary plate when the work piece 22 on moveable plate engages heating plate 152 and overcomes the spring's force. Timer 186 is simultaneously activated to measure the time for holding the work pieces against the heat plate while plate actuator 62 is activated. After a pre-determined time, controller 182 causes plate actuating assembly to move the moveable plate away from the stationary plate so that the molten ends of work pieces 22 disengage from the heat plate. Instead of using timer 186, sensors and/or switches (not shown) for measuring distance moved by moveable plate during the heating process may be used to determine cycle time.

Once the plate actuating assembly moves the work pieces 22 with the molten ends away from heat plate, controller 182 causes heater actuating assembly to move the heat plate away from between the ends of the work pieces. Controller 182 then causes plate actuating assembly to move the moveable plate a pre-determined distance so that the molten ends of each work piece abut one another. The molten ends of each work piece are compressed by plate actuating assembly into one another a pre-distance (preferably in the range of 0.5 to 5 millimeters) that is sufficient to ensure that the two ends are completely welded together and to make up for any imperfections in the square edges of the two work pieces. Concurrently, flashing remover 170 acts to remove or to define a weakened edge on the flashing 173 formed by the compressed work pieces 22.

The timer 186 is activated when the plate actuating assembly moves the molten ends of the work pieces into abutment. After a pre-determined cooling period has passed, controller 182 causes the first and second work piece clamps and site clamps to be moved to an unclamped position in order to release the welded work piece and the plate actuator assembly to move the moveable plate to a position away from the stationary plate so that the machine is ready for the next welding operation. The welded work piece is then ready to be removed from the machine.

At any point during the machine operation, if the operator senses that an unsafe condition has arisen, the operator may press the emergency Stop button 210 to release the clamps and actuators and stop the welding operation.

In use, a person installing work pieces 22, such as rain gutters, at a worksite would first determine the length of continuous work piece required and would select a sufficient number of work piece sections to form the desired length. The work pieces would then be welded together using the portable welding machine described above until the desired length of continuous work piece is obtained (some cutting of the work piece sections before or after welding may be required. The resulting welded work piece (such as a rain gutter) would then be secured to a building in known fashion.

It is to be understood that what has been described is a preferred embodiment to the invention. If the invention nonetheless is susceptible to certain changes and alternative embodiments fully comprehended by the spirit of the invention as described above, and the scope of the claims set out below.

The invention claimed is:

1. A machine for welding the ends of two thermo-plastic rain gutters together, the machine comprising:
   (a) a frame assembly;
   (b) a first holder disposed on said frame assembly for supporting the first rain gutter, said first holder having a cross sectional profile corresponding to the cross sectional profile of the first rain gutter;
   (c) a second holder disposed on said frame assembly for supporting the second rain gutter, said second holder having a cross sectional profile corresponding to the cross sectional profile of the second rain gutter;
   (d) a first clamp assembly disposed on said frame assembly for clamping the first rain gutter against the first holder;
   (e) a second clamp assembly disposed on said frame assembly for clamping the second rain gutter against the second holder;

(f) a heater disposed on said frame assembly for heating the ends of the first and second rain gutters a sufficient amount to permit the ends of the rain gutters to be welded together, wherein said heater includes a groove defined on at least one surface, said groove being configured to receive the end of a corresponding one of said rain gutters; and (g) a press disposed on said frame assembly for pressing and holding the molten ends of the first and second rain gutters together so that the molten ends become welded together.

2. A machine as claimed in claim 1 wherein said heater is supported in a spring biased relationship on said frame assembly to allow said heater to resiliently move to accommodate imperfections in the ends of said rain gutter ends.

3. A machine as claimed in claim 1 further comprising at least one flashing remover defined on said assembly, said flashing remover having an inclined leading edge for engaging the flashing formed when said rain gutters are pressed together.

4. A machine as claimed in claim 1 wherein said frame assembly is disposed upon a wheeled carriage.

5. A machine as claimed in claim 1 further comprising a controller for at least said heater and said press.

6. A machine for welding the ends of two thermo-plastic non-cylindrical work pieces together, the machine comprising:

(a) a frame assembly;

(b) a first holder disposed on said frame assembly for supporting the first work piece, said first holder having a cross sectional profile corresponding to the cross sectional profile of the first work piece;

(c) a second holder disposed on said frame assembly for supporting the second work piece, said second holder having a cross sectional profile corresponding to the cross sectional profile of the second work piece;

(d) a first clamp assembly disposed on said frame assembly for clamping the first work piece against the first holder;

(e) a second clamp assembly disposed on said frame assembly for clamping the second work piece against the second holder;

(f) a heater disposed on said frame assembly for heating the ends of the first and second work pieces a sufficient amount to permit the work pieces to be welded together, wherein said heater includes a groove defined on at least one surface, said groove being configured to receive the end of a corresponding one of said work pieces; and (g) a press disposed on said frame assembly for pressing and holding the molten ends of the first and second work pieces together so that the molten ends become welded together.

7. A machine as claimed in claim 6 wherein said heater is supported in a spring biased relationship on said frame assembly to allow said heater to resiliently move to accommodate imperfections in the ends of said work pieces.

8. A machine as claimed in claim 6 further comprising at least one flashing remover defined on said assembly, said flashing remover having an inclined leading edge for engaging the flashing formed when said work pieces are pressed together.

9. A machine as claimed in claim 6 wherein said frame assembly is disposed upon a wheeled carriage.

10. A machine as claimed in claim 6 further comprising a controller for at least said heater and said press.

11. A portable machine for welding the ends of two thermo-plastic rain gutters together, the portable machine comprising:

(a) a first assembly for securing the first rain gutter and a second assembly for securing the second rain gutter;

(b) a heater for heating the ends of at least one of the first and second rain gutters a sufficient amount to permit the ends of the first and second rain gutters to be welded together, said heater defining at least one groove that is configured to receive the end of one of said first and second rain gutters; and (c) a press for pressing and holding the ends of the first and second rain gutters together so that the ends may become welded together.

12. A machine as claimed in claim 11 wherein said machine is disposed upon a wheeled carriage.

13. A machine as claimed in claim 11 further comprising a flashing tool disposed on at least one of said first and second assemblies, said tool having an inclined leading edge for engaging the flashing formed when said rain gutters are pressed together.

14. A machine as claimed in claim 11 further comprising a controller for controlling at least said heater and said press.

15. A portable machine for welding the ends of two thermo-plastic work pieces together, the portable machine comprising:

(a) a first assembly for securing a first work piece and a second assembly for securing a second work piece;

(b) a heater for heating the ends of at least one of the first and second work pieces a sufficient amount to permit the ends of the first and second work pieces to be welded together, wherein said heater defines at least one groove that is configured to receive the end of one of said first and second work pieces;

(c) a press for pressing and holding the ends of the first and second work pieces together so that the ends may become welded together; and (d) a flashing tool having an inclined leading edge for engaging, and facilitating removal of, a flashing formed when said first and second work pieces are pressed together.

16. A machine as claimed in claim 15 wherein said machine is disposed upon a wheeled carriage.

17. A machine as claimed in claim 15 further comprising a controller for controlling at least said heater and said press.

* * * * *